United States Patent
Merritt

[11] Patent Number: 5,101,592
[45] Date of Patent: Apr. 7, 1992

[54] FISHING WEIGHT

[76] Inventor: Roy K. Merritt, 1210 Genoa Red Bluff Rd., Houston, Tex. 77034

[21] Appl. No.: 636,724
[22] Filed: Jan. 2, 1991
[51] Int. Cl.⁵ .............................................. A01K 95/00
[52] U.S. Cl. .................................. 43/43.13; 43/44.96; 114/294
[58] Field of Search .................... 43/43.13, 44.9, 44.91, 43/44.96; 114/294, 300, 301

[56] References Cited

U.S. PATENT DOCUMENTS 2,256,768  9/1941  Taylor ................................. 43/44.96
2,457,358 12/1948  Flaugher ............................ 43/44.96
4,649,663  3/1987  Strickland ........................... 43/44.9

FOREIGN PATENT DOCUMENTS 1100270  1/1968  United Kingdom ............... 43/44.96

*Primary Examiner*—Richard K. Seidel
*Assistant Examiner*—Chuck Y. Mah
*Attorney, Agent, or Firm*—Harrison & Egbert

[57] ABSTRACT

A fishing weight having a body, at least two fins, and a connector suitable for connecting the body to a fishing line. Each of the fins is formed longitudinally along and extending outwardly from the body. Each of the fins has a forward portion inclined with respect to the longitudinal axis of the body and a rearward portion having a greater angle of inclination than the forward portion. The rearward portion is connected to the forward portion and extends angularly outwardly therefrom. The body is pointed at one end. Each of the fins has a V-shaped configuration that extends from the body. An eyelet is provided for connecting the body to a fishing line. The body and the fins are integrally formed of a leaden material.

16 Claims, 3 Drawing Sheets

FISHING WEIGHT

TECHNICAL FIELD

The present invention relates to fishing sinkers and weights. In particular, the present invention relates to such sinkers and weights which are particularly suitable for surf fishing.

BACKGROUND ART

Conventional fishing sinkers serve a variety of functions. As projectile weight, they aid the anglar in attaining greater casting distances so that he can place his bait in desired locations. Upon contacting the water, being denser than water, they sink into the fishing environment and carry with them the accompanying bait until they reach a predetermined depth or, if unfettered by a float, they continue to sink until coming to rest on the floor of the fishing bed. Upon coming to rest, fishing sinkers act, to some degree, as anchors for the purpose of partially maintaining the bait in the desired cast location. It is in this final function that conventional sinkers prove to be unsatisfactory in surf fishing or in any type of fishing environment in which strong water motion in the fishing environment is encountered.

A conventional fishing sinker is usually made of a dense material, such as lead, and molded into a relatively compact shape. Whatever anchoring action it has on the floor of the fishing bed depends on the frictional forces exerted on it by the floor. Such forces, when using a customary weight sinker of two or three ounces, are typically insufficient to keep the sinker from being tossed about or rolled along the floor by strong water currents and wave actions. As a result, the angler's hook, bait and sinker become displaced from the desired location and often become ensnarled in underwater obstructions and forever lost.

Others in the past have proposed providing conventional fishing sinkers with various configurations of straight spikes to engage the floor and, thus, provide additional anchoring. Unfortunately, such spiked sinkers have been largely unsuccessful since they provide little useful contact into the water floor. Indeed, alternate forms of such spiked sinkers have been equipped with upwardly directed spikes and employed as grapplers wherein the fouling properties of such upwardly directed spikes have been utilized to permanently secure a line to the floor of the fishing bed. Such properties are highly undesirable in the usual fishing sinker which must be easily retrievable upon demand.

Spiked fishing sinkers have other undesired and dangerous properties. The spikes, when in rapid motion as encountered in the usual casting and retrieving actions, can impale and damage the catch and can do the same to the surrounding human beings.

Another sinker requirement, from the standpoint of achieving maximum distance in surf casting, is that the sinker be reasonably streamlined and that it does not tend to flutter or oscillate so that it offers a minimum resistance to its travel through the air. The wind resistance contributed by the baited hook, the weight, and the line will also be in factor in determining the distance achieved by the surf caster.

The sinker should hold the baited hook or hooks at the location to which it has been cast until a fish has been caught or the fisherman desires to retrieve it. This function of the sinker introduces additional requirements which are not entirely consistent with the ability to cast the sinker as far as possible. The fisherman generally desires to keep some tension on the line so that he will be aware of a fish picking up the bait. On a windy day, the action of the wind and waves on the line cause a pull on the sinker which is frequently sufficient to dislodge it and the baited hook sinker and line will gradually wash up on the beach. Surf fisherman using conventional casting reels most frequently use "pyramid" sinkers weighing approximately four ounces. Those who use reels of the "spinning" variety, in which a relatively light "monofilament" line is employed, may use sinkers of two or three ounces. When the wind and waves are such that the sinker which the fisherman is using will not hold the baited hook in the desired position, the fisherman resorts to a heavier sinker. Under unfavorable conditions, it is not uncommon for surf fisherman to resort to sinkers weighing six or eight ounces. These heavy sinkers make casting much more difficult and frequently prevent the fisherman from determining when a fish has picked up the bait.

It is an object of the present invention to provide a fishing weight that is suitable for engaging the fishing bed.

It is another object of the present invention to provide a fishing weight that can be easily removed from the fishing bed after anchoring.

It is another object of the present invention to provide a fishing weight that has an aerodynamic and hydrodynamic configuration.

It is a further object of the present invention to provide a fishing weight that is relatively easy to manufacture and uncomplicated to use.

These and other objects and advantages of the present invention will become apparent from a reading of the attached specification and appended claims

SUMMARY OF THE INVENTION

The present invention is a fishing weight that comprises a body, at least two fins formed longitudinally along the body and extending outwardly therefrom, and a suitable means for attaching the body to a fishing line.

Each of the fins has a forward portion inclined with respect to the longitudinal axis of the body. The fins also include a rearward portion having a greater angle of inclination than the forward portion. The rearward portion of the fins extend outwardly from the body a greater distance than does the forward portion of the fins. Each of the fins forms a generally pointed end of the body. The fins have a V-shaped configuration extending outwardly from the body such that the narrow end of the V-shaped configuration is distal the body.

In particular, in one embodiment, the fishing weight includes a first fin and a second fin. The second fin extends radially outwardly from the body so as to be positioned opposite to and aligned with the first fin. As such, the fishing weight has a generally flat profile.

In another embodiment of the present invention, three fins extend radially outwardly from the body. Each of the fins is separated from an adjacent fin by an equal angle. As such, the profile of the fishing weight has a generally "Y"-shaped configuration.

A third, and preferred, embodiment of the present invention utilizes four fins. Each of the fins extends radially outwardly from the body and perpendicular to an adjacent fin. As such, the fishing weight takes on a roughly "X"-shaped configuration.

The forward portion and rearward portion of each of the fins are integrally formed together. The angle of inclination of the rearward portion extends upwardly from the end of the forward portion. In addition, the body and the fins of the fishing weight of the present invention are also integrally formed together. The fishing weight of the present invention is comprised of a leaden material.

One end of the fishing weight is a generally pointed end. The other end of the fishing weight has a flat end surface. An eyelet extends outwardly from this end surface so as to properly engage a fishing line. Alternatively, a hole may extend through the longitudinal axis of the fishing weight so as to receive a fishing line therethrough.

DETAILED DESCRIPTION OF THE INVENTION

Figure 1:
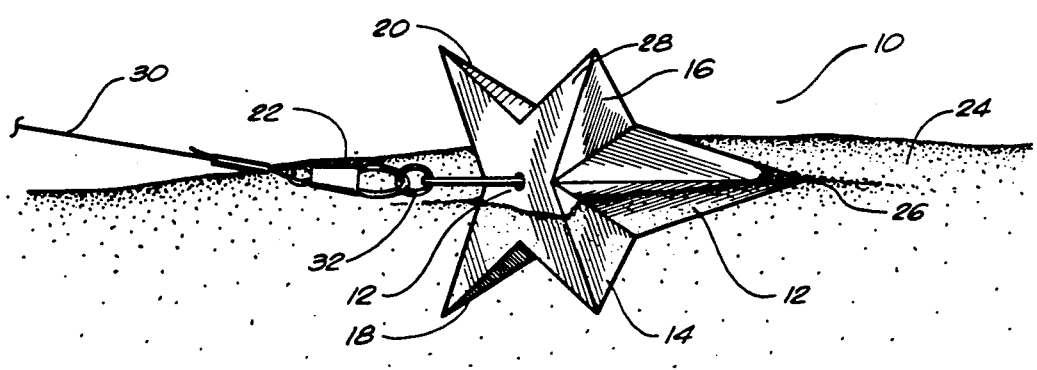
FIG. 1 shows a perspective view of the preferred embodiment of the fishing weight of the present invention showing the fishing weight, in particular, as embedded in the floor of a body of water.

Referring to FIG. 1, there is shown at 10 the fishing weight in accordance with the preferred embodiment of the present invention. Fishing weight 10 comprises a body 12, a first fin 14, a second fin 16, a third fin 18, a fourth fin 20, and suitable means 22 for connecting the body 12 to a fishing line. As can be seen in FIG. 1, the fishing weight 10 is shown as embedded into the floor 24 of a body of water.

Each of the fins 14, 16, 18 and 20 are formed longitudinally along and extend radially outwardly from the body 12. Each of the fins 14, 16, 18 and 20 is positioned so as to be perpendicular an adjacent fin. Each of the fins 14, 16, 18 and 20 should have a configuration identical to the other fins. As can be seen, each of the fins 14, 16, 18 and 20 have a V-shaped cross-section. This V-shaped configuration is such that the wide end of the V-shape is adjacent to body 12. The narrow portion of the V-shaped configuration is distal to the body 12.

In FIG. 1, it can be seen that the fin 14 is on the opposite side of body 12 from that of fin 20. Similarly, fin 16 is on the opposite side of body 12 from fin 18. The fins 14 and 18 are shown as embedded into the floor 24 of a body of water. The remainder of the body 12 rests on the surface of floor 24.

It can be seen that body 12 has a pointed end 26. The opposite end of fishing weight 10 is a flat surface 28. The pointed end 26 is formed by the body and the combination of the fins 14, 16, 18 and 20. The body 12 and the fins 14, 16, 18 and 20 are integrally formed together.

The fishing weight 10 is generally formed of a lead material or a lead-zinc alloy.

As can be seen in FIG. 1, the means for connecting the body 12 to a fishing line 30 is an eyelet 32. Eyelet 32 engages the fishing line so that the fishing line can send and return the weight (and the associated bait) as desired.

Figure 2:
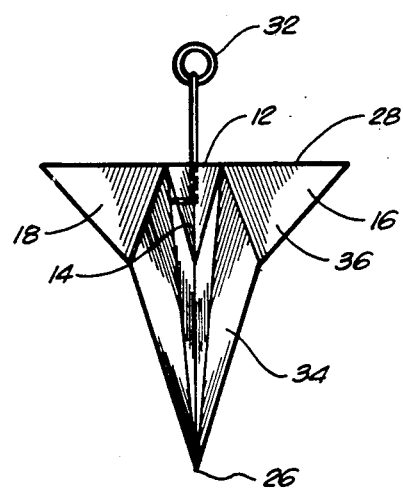
FIG. 2 is a view, in side elevation, of the preferred embodiment of the fishing weight of the present invention.

FIG. 2 shows a side view of the fishing weight 10. It can be seen that the fishing weight 10 includes the pointed end 26 and the flat end 28. The eyelet 32 is fastened to the flat surface 28 so as to extend outwardly perpendicular thereto. Fins 16 and 18 are illustrated as positioned opposite to each other relative to body 12. The view of FIG. 2 also shows the fin 14 as positioned between the fins 16 and 18.

Of particular note in FIG. 2 is the configuration of the fins 14, 16, 18 and 20. The fins were especially designed for aerodynamic and hydrodynamic action. The fins were also designed so as to allow for the ease of embedding into the floor 24 of a body of water. The shape of the fins also contributes to the ability to place and remove the fishing weight 10, as desired.

In FIG. 2, fin 16 includes a forward portion 34 that extends from pointed end 26 to the rearward portion 36. The forward portion is inclined with respect to the longitudinal axis of the body 12. The forward portion 34 is inclined at a relatively shallow angle. The rearward portion of fin 16 has a greater angle of inclination from the longitudinal axis of body 12. This steeper angle of inclination extends from the end of the forward portion 34. In particular, the rearward portion 36 forms approximately a forty-five degree (45°) angle with respect to the longitudinal axis of the body 12. The fins 14, 18 and 20 have an identical configuration to that of fin 16.

Figure 3:
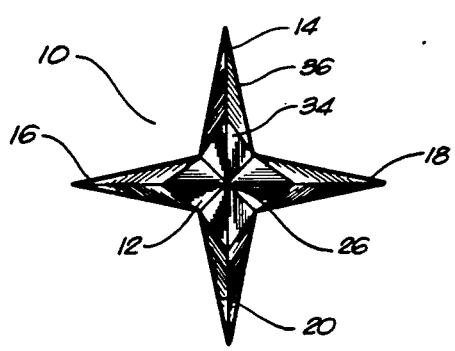
FIG. 3 is a front end view of the preferred embodiment of fishing weight of the the present invention.

FIG. 3 is a view of the fishing weight 10 as seen from the pointed end 26. It can be seen that the fins 14, 16, 18, and 20 are arranged perpendicular to each other. Fins 16 and 18 are aligned with each other on opposite sides of body 12. Similarly, fins 14 and 20 are arranged on opposite sides of body 12 and are aligned with each other. Each of the fins 14, 16, 18 and 20 has a V-shaped configuration. It can be seen that the rearward portion 36 of fin 14 extends upwardly and beyond the forward portion 34. As can be seen, the rearward portion 36 has a greater height than that of the forward portion 34.

The fishing weight 10, as shown in FIGS. 1-3 shows the preferred embodiment of the present invention. The present invention is a unique aerodynamically designed fishing sinker which is easier to cast a greater distance, with more accuracy, than conventional sinkers. The sharp-pointed pyramid, double-angled, four-fined design contributes to this aerodynamic configuration. As a result, there is minimal resistance to the air. The fins 14, 16, 18 and 20 act as wings so as to provide the sinker 10 with maximum lift and as stabilizers to ensure maximum accuracy. The sharp-pointed end 26 of the fishing weight 10 provides for a minimum splash when the sinker enters the water following the cast. Because of &his smaller splash, there is less chance of spooking a fish that might be in the vicinity. As with any sinker, the "X"-shaped sinker 10 will tend to bury itself into the sandy bottom 24 of the surf. This burying action can occur because of the current and wave action. Since this "X"-shaped sinker 10 has a much larger surface area, ounce for ounce, then conventional sinkers, and since the fins will be buried deeper into the bottom, it will have more holding power. This will resist the build-up of seaweed, plastic, or other foreign objects that may hang on the fishing line. The design of the present invention is such that the stronger the current and/or wave action, the deeper this "X"-shaped sinker will bury itself into the bottom.

The fishing weight 10 of the present invention also has the advantage of allowing the fisherman to use a much lighter weight sinker. This also enables the fisherman to use a lighter or smaller diameter fishing line. As a result, there is even less drag due to the current and/or wave action. This also makes it easier for the fisherman to feel a fish when it hits the bait.

By holding the rod tip high and by applying a steady strain or pull on the line, when retrieving the sinker will break loose from the sandy bottom rather easily. By reeling the line back in a relatively fast fashion, the sinker 10 will lift off the bottom. It will not drag on the bottom 24 because of the hydroplaning action created by the lift on the fins 14, 16, 18 and 20.

Figure 4:
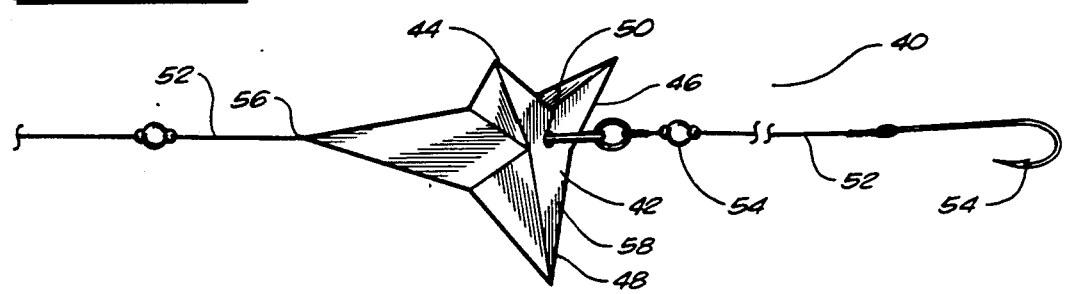
FIG. 4 is a perspective view of an alternative embodiment of the fishing weight of the present invention.

FIG. 4 illustrates an alternative embodiment 40 of the fishing weight of the present invention. Fishing weight 40 includes a body 42 having fins 44, 46, and 48 extending outwardly therefrom. A hole 50 extends through the longitudinal axis of the body 42 so as to receive a fishing line 52. The configuration of the fishing weight 40, as shown in FIG. 4, is for the purpose of allowing the bait to be fastened to a hook 54 at the bottom of the body of water. The weight 40 will rest on, or be embedded in, the floor of a body of water. The line 52 will extend outwardly from the weight 40. A stop 54 is provided on fishing line 52 so as to prevent the weight 40 from encountering the hook 54.

As can be seen, the weight 40 has three fins 44, 46 and 48. These fins extend outwardly from the body 42. The fins 44, 46 and 48 terminate at the pointed end 56 and at the flat end 58.

Figure 5:
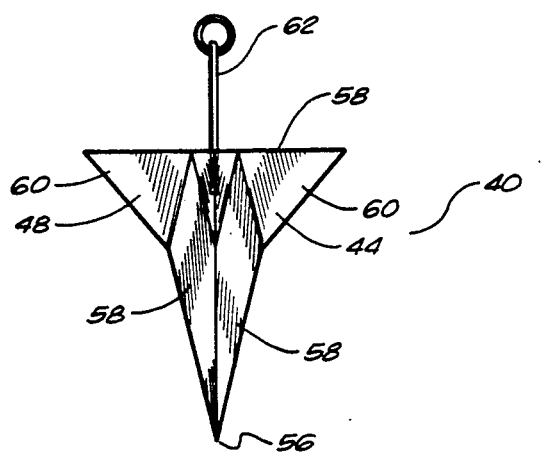
FIG. 5 is a side elevational view of the alternative embodiment of FIG. 4 of the present invention.

FIG. 5 shows the alternative embodiment 40. In particular, the alternative embodiment 40 shows the arrangement of the fins 44 and 48. As can be seen, each of the fins of the alternative embodiment 40 have a configuration similar to the shape of each of the fins of the preferred embodiment 10. Specifically, each of the fins 44 and 48 includes a forward portion 58 and a rearward portion 60. In contrast to FIG. 4, an eyelet member 62 is fastened to the flat back surface 58 of fishing weight 40. In the embodiment of FIG. 5, the eyelet member 62 serves as the means for attaching the fishing weight 40 to a fishing line.

Figure 6:
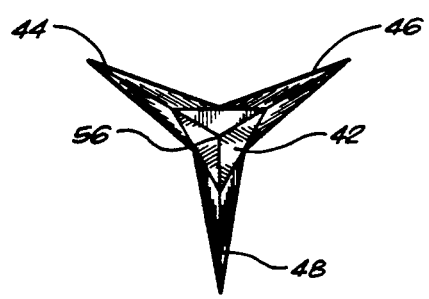
FIG. 6 is a frontal end view of the alternative embodiment of the present invention of FIGS. 4 and 5.

FIG. 6 shows the arrangement of the fins 44, 46 and 48 as seen from the pointed end 56 of body 42. It can be seen that each of the fins 44, 46 and 48 has a configuration similar to the configuration of the fins described and shown in conjunction with the preferred embodiment 10. However, in contrast to the preferred embodiment 10, each of the fins 44, 46 and 48 is separated from an adjacent fin by approximately 120°. There is an equal angular distance between each of the fins 44, 46 and 48. As such, the alternative embodiment shows a generally "Y"-type shape.

The objective of this double-angled, three-finned Y-type designed fishing sinker is to provide the fisherman with a sinker that is easily cast a great distance. It also provides a sinker with superior restraint once it is on the bottom.

When this Y-type sinker 40 is cast, it exhibits superior aerodynamic characteristics. The three fins act as wings to supply lift for a further cast. They also behave as stabilizers for greater accuracy. The sharp pointed, triangular, pyramidal configuration presents the least amount of resistance to the air while the sinker is in flight. It also causes the least amount of splash when entering the water following the cast.

The sinker 40, of this alternative embodiment, is designed for use where there is loose sand or ground-up coral (or shells) washed up on the beach. When one fin buries itself into the bottom, the other two fins will lay on the bottom. This leaves little or nothing above the bottom of the body of water for the current to act against. Therefore, the sinker 40 should remain in place until it is retrieved by the fisherman.

By holding the rod tip high when retrieving this "Y"-type sinker 40, and by applying a steady strain on the line, the sinker 40 will break loose from the bottom. Once the sinker is free from the bottom, the fisherman should reel the line back in relatively fast so as not to drag the sinker along the bottom.

Figure 7:
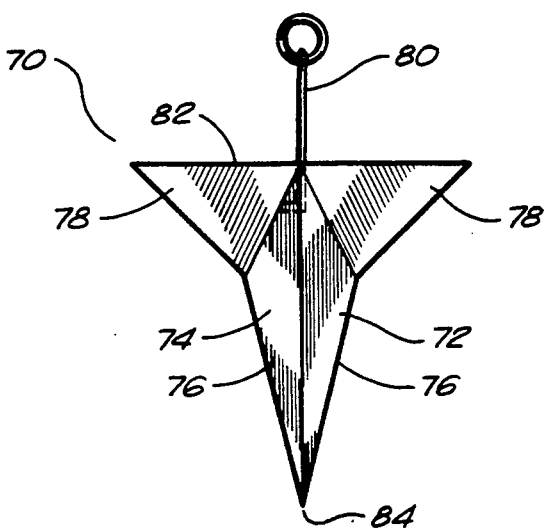
FIG. 7 is a side elevational view of another alternative embodiment of the present invention.

FIG. 7 shows yet another alternative embodiment 70 of the fishing weight of the present invention. Fishing weight 70 is a two-fin configuration of the fishing weight of the present invention.

Fishing weight 70 includes a first fin 72 and a second fin 74. The fins 72 and 74 are placed opposite to each other and aligned with each other. Each of the fins 72 and 74 has a configuration similar to the fins described in the previous embodiments. Specifically, each of the fins 72 and 74 have a narrowly inclined forward portion 76 and a more greatly inclined rearward portion 78. A eyelet member 80 is fastened to the flat back surface 82 of fishing weight 70. Eyelet 80 provides a means for attachment to a fishing line.

Figure 8:
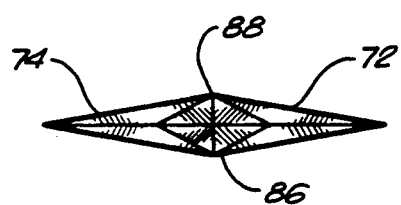
FIG. 8 is an end view of the embodiment of FIG. 7.

In FIG. 8, there is a view of the alternative embodiment 70 as taken from the pointed end 84 of fishing weight 70. In FIG. 8, it can be seen that the fins 72 and 74 are aligned with each other on the opposite side of the body 86. Since each of the fins 72 and 74 has a V-shaped configuration, the open end of the V's join with each other at point 88. As such, the fishing weight 70 has a rather flat profile. This two-finned "I"-design is intended for use where the bottom of the body of water is too hard or where the current in the water is too strong to permit the previous embodiments of the sinker to dig into the bottom. As such, this "I"-type design can rest in an aerodynamic fashion on the floor of the body of water. Because of this aerodynamic and hydrodynamic configuration, the movement of the water is less likely to affect the placement of the weight 70. Also, during movement, as desired by the fisherman, the hydrodynamic design of the weight 70 will allow this movement to occur without unnecessary force. As such, much lighter line can be used during fishing.

The foregoing disclosure and description of the invention is illustrative and explanatory thereof, and various changes in the details of the illustrated apparatus, can be made within the scope of the appended claims without departing from the spirit of the invention The present invention should only be limited by the following claims and their legal equivalents.

I claim:

1. A fishing weight comprising:
   a body;
   at least two fins and no more than four fins formed longitudinally and extending radially outwardly along said body, each of said fins having a forward portion inclined with respect to a longitudinal axis of said body, each of said fins having a rearward portion with a greater angle of inclination than said forward portion, said rearward portion connected to said forward portion, said fins forming a generally pointed end, said fins of said body forming a generally flat end surface opposite said pointed end; and means for connecting said body to a fishing line, said means comprising an eyelet member extending outwardly from said flat end surface opposite said pointed end.

2. The fishing weight of claim 1, each of said fins having a V-shaped configuration extending from said body.

3. The fishing weight of claim 1, said fins comprising:
a first fin extending radially outwardly from said body; and
a second fin extending radially outwardly from said body, said second fin positioned opposite to and aligned with said first fin.

4. The fishing weight of claim 3, further comprising:
a third fin extending radially outwardly from said body, said third fin generally perpendicular to said first and second fins.

5. The fishing weight of claim 4, further comprising:
a fourth fin extending radially outwardly from said body, said fourth fin opposite said third fin and generally perpendicular to said first and second fins.

6. The fishing weight of claim 1, said fins comprising:
a first fin extending radially outwardly from said body;
a second fin extending radially outwardly from said body; and
a third fin extending radially outwardly from said body, each of said fins separated from an adjacent fin by generally equal angles 7. The fishing weight of claim 1, said body and said fins integrally formed together.

8. The fishing weight of claim 7, said forward portion and said rearward portion of said fins integrally formed together, said rearward portion extending outwardly a greater distance than said forward portion.

9. The fishing weight of claim 1, said means for connecting said body to a fishing line comprising:
a hole extending longitudinally through said body, said hole for receiving said fishing line.

10. A fishing weight comprising:
a body;
a first fin extending radially outwardly from said body, said first fin having a forward portion inclined with respect to a longitudinal axis of said body, said first fin having a rearward portion with a greater angle of inclination from the longitudinal axis than said forward portion;
a second fin extending radially outwardly from said body, said second fin having a forward portion inclined with respect to the longitudinal axis of said body, said second fin having a rearward portion with a greater angle of inclination from the longitudinal axis than said forward portion;
a third fin extending radially outwardly from said body, said third fin having a forward portion inclined with respect to a longitudinal axis of said body, said third fin having a rearward portion with a greater angle of inclination from the longitudinal axis than said forward portion, said first, second and third fins at one end forming a generally pointed end, each of said fins separated from an adjacent fin by an angle of approximately 120°, said fins and said body forming a flat end surface; and
means for connecting said body to a fishing line, said means fastened to and extending outwardly from said flat end surface.

11. The fishing weight of claim 10, said body and said fins integrally formed together.

12. The fishing weight of claim 10, said forward portion and said rearward portion of each of said first, second and third fins integrally formed together, said rearward portion extending outwardly from said body a greater distance than said forward portion.

13. A fishing weight comprising:
a body;
a first fin extending radially outwardly from said body;
a second fin extending radially outwardly from said body;
a third fin extending radially outwardly from said body;
a fourth fin extending radially outwardly from said body, each of said first, second, third and fourth fins having a forward portion inclined with respect to the longitudinal axis of said body and a rearward portion having a greater angle of inclination than said forward portion, each of said fins separated from an adjacent fin by approximately 90°, said fins and said body having a flat end surface; and
means for connecting said body to a fishing line, said means fastened to said flat end surface and extending outwardly therefrom.

14. The fishing weight of claim 13, each of said fins having a V-shaped cross-section, said V-shaped cross-section having a wide end adjacent said body.

15. The fishing weight of claim 13, said fishing weight comprised of a leaden material.

16. The fishing weight of claim 13, said body and said fins integrally formed together.

* * * * *